United States Patent
Pizzato et al.

(10) Patent No.: US 11,151,822 B2
(45) Date of Patent: *Oct. 19, 2021

(54) SAFETY SWITCH FOR CONTROLLING THE ACCESS TO INDUSTRIAL MACHINES OR PLANTS

(71) Applicant: PIZZATO ELETTRICA S.R.L., Marostica (IT)

(72) Inventors: Marco Pizzato, Marostica (IT); Giuseppe Pizzato, Marostica (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/762,187

(22) PCT Filed: Oct. 31, 2018

(86) PCT No.: PCT/IB2018/058550
§ 371 (c)(1),
(2) Date: May 7, 2020

(87) PCT Pub. No.: WO2019/092555
PCT Pub. Date: May 16, 2019

(65) Prior Publication Data
US 2020/0265664 A1    Aug. 20, 2020

(30) Foreign Application Priority Data
Nov. 8, 2017    (IT) ........................ 102017000127144

(51) Int. Cl.
G07C 9/00    (2020.01)
F16P 3/08    (2006.01)
G06K 7/10    (2006.01)

(52) U.S. Cl.
CPC ............ *G07C 9/00706* (2013.01); *F16P 3/08* (2013.01); *G06K 7/10297* (2013.01)

(58) Field of Classification Search
CPC .. H01H 47/004; H01H 47/002; H01H 47/005; G05B 9/03; G05B 19/0428; G05B 19/048; H03K 17/9502; H03K 17/965
See application file for complete search history.

(56) References Cited

U.S. PATENT DOCUMENTS 5,861,786 A * 1/1999 Laveau ................ H01H 27/007
335/132
7,456,368 B2 * 11/2008 Fukumoto ................. F16P 3/08
200/329

(Continued)

*Primary Examiner* — Mirza F Alam
(74) *Attorney, Agent, or Firm* — Mark M. Friedman

(57) ABSTRACT

A safety switch for controlling the access to industrial machines comprises a switching device having switching means, an actuator device (3) to interact with the switching means at the opening/closing of the access for passing from a removed condition to an inserted condition, locking/unlocking means adapted to lock the actuator device on the switching device following their mutual interaction, an electronic control unit having a first communication channel with a first inlet and a first outlet and a second communication channel with a second inlet and a second outlet, wherein said first inlet and said second outlet are of safe type and adapted to vary their state after detecting the condition of said actuator device and wherein said electronic control unit is adapted to vary the state of said first outlet and said second outlet upon detection respectively of a first and a of second condition for said actuator device.

10 Claims, 2 Drawing Sheets

(56) References Cited

U.S. PATENT DOCUMENTS

| | | | | |
|---|---|---|---|---|
| 7,775,072 B2 * | 8/2010 | Pullmann | .............. | E05B 15/101 |
| | | | | 70/208 |
| 2004/0159134 A1 * | 8/2004 | Eichenauer | ......... | E05B 47/0046 |
| | | | | 70/278.1 |
| 2011/0259060 A1 * | 10/2011 | Leska | ....................... | F16P 3/10 |
| | | | | 70/174 |

* cited by examiner

SAFETY SWITCH FOR CONTROLLING THE ACCESS TO INDUSTRIAL MACHINES OR PLANTS

TECHNICAL FIELD

The present invention finds application in the field of electrical devices for industrial use and has particularly as object a safety switch designed for controlling an access to a machine or industrial plant.

STATE OF THE ART

As known, the switches designed to controlling the access to machines or industrial plants, such as protection panels, barriers, safety perimeters, comprise a switching device adapted to be anchored to the fixed part of the access and an actuator device adapted to be anchored to the moving part.

In a known manner, upon the closure of the movable part, the interaction between the switching device and the actuator device is produced, making it possible to start the machine or plant, unless there are conditions that require the specific intervention of an operator.

On the contrary, the opening of the access and the consequent moving away of the actuator device from the switching device produces the immediate or timed stop of the machine or plant in order to allow access to it in safe conditions.

These switches require a higher degree of safety, the greater the risk associated with an unsafe entry into the plant when one or more machines are still moving.

Some examples of such switches are described in WO2015/083143 and WO2015/155744, both in the name of the present Applicant.

The safety degree of a switch is also determined by the structure of the electronic circuits that control the communication channels thereof and manage the switching state of the input and output ports, in order to transmit appropriate signals as function of the opening or closing conditions of the access or of the unlocked but closed condition of the access.

In particular, in the switch having higher safety degree there are two communication channels having both inputs and outputs of a safe type and in which the safe outputs are activated or deactivated simultaneously following the release of the actuator and its extraction or subsequently at the only unlocking, depending on the mode of operation, so as to interrupt the entire line as a result of the unlocking and/or opening of even one of the accesses.

However, this safe mode of operation is not necessary in low-technology processing lines for which single-channel management is sufficient, such as the most common electromechanical woodworking lines.

As matter of fact, in these cases it may be sufficient to stop only the part of the system associated with the specific unlocked and/or open access without affecting the overall safety of the line.

Moreover, the adoption of a switch with a high degree of safety may not be economically convenient for these types of lines.

Furthermore, the application of these switches within these lines in place of the commonly used switch would require a rewiring of the entire line, with an increase in the costs associated with greater work and higher costs that are not always justifiable.

Scope of the Invention

The object of the present invention is to overcome the aforementioned drawbacks by providing a safety switch for controlling access to industrial machines or plants which is characterized by high efficiency and relative cost-effectiveness.

A particular object is to provide a safety switch for the control of access to machines or industrial plants that allows to manage several actuators differently in order to manage the shutdown and restart of the various moving parts of the plant in a distinct manner.

Another object is to provide a safety switch for controlling access to machines or industrial plants that allows differentiated detection of the actuators associated with a same line as well as the detection of the different states of insertion/extraction and lock/unlock.

Another object is to provide a safety switch for controlling access to machines or industrial plants that can be applied in an economical manner even to plants with a relatively low level of safety, allowing the increasing of the degree of safety thereof.

These objects, as well as others that will become clearer later, are achieved by a safety switch for controlling access to machines or industrial plants which, according to claim 1, comprises a switching device adapted to be associated with a fixed part of the access to be controlled and having switching means adapted to be operatively connected to one or more control and/or service circuits of the plant for controlling them, an actuator device associable to a movable part of the access to interact with said switching means at the opening/closing of the access for opening/closing one or more of said circuits and passing from a removed condition to an inserted condition and vice versa, locking/unlocking means housed in said switching device and adapted to lock/unlock said actuator device with respect to said switching device, an electronic control unit having a first communication channel with a first input and a first output and a second communication channel with a second input and a second output, said channels being adapted to receive and transmit information relating to the locked and open conditions of the accesses as function of the state of the corresponding actuator device, wherein said first and second outputs are of a safe type and adapted to vary their state upon detection of said removed/inserted and/or locked/unlocked condition of said actuator device.

Moreover, said control unit is adapted to vary the state of said first and second outputs upon to the detection respectively of first and second conditions for said actuator device, wherein said first and said second conditions are different from each other.

Thanks to this combination of features, it will be possible to manage the actuator devices and the associated accesses in a differentiated manner and it could be possible, for example, in the event of unlocking of an actuator device, to stop the associated portion of the plant but without interrupting other parts of the plant associated with different accesses. Moreover, the structure of the control unit will be substantially a double single-channel structure, which maintains the redundancy in the error control, and which in any case allows the switch to be applied even to conventional control circuits with a single-channel structure without rewiring of the entire line is required.

Advantageous embodiments of the invention are obtained according to the dependent claims.

BRIEF DISCLOSURE OF THE DRAWINGS

Further features and advantages of the invention will become more apparent in the light of the detailed description of a preferred but not exclusive embodiment of a safety switch according to the invention, illustrated as a non-limiting example with the aid of the accompanying drawings wherein.

BEST MODE OF CARRYING OUT THE INVENTION

With reference to the attached figures, there is shown a preferred but non-exclusive embodiment of a safety switch for controlling access to machines or industrial plants designed to be applied, preferably but not exclusively, to a barrier or mobile panel protection to prevent unsafe access to a machine or industrial plant during operation.

In a known manner, the switch will be designed to be applied to the protection at an access thereof to interrupt the operation of the machine or plant in a substantially immediate or timed manner in the event of opening of a door or closing panel for said access or in the event of a request for opening such access.

Figure 1:
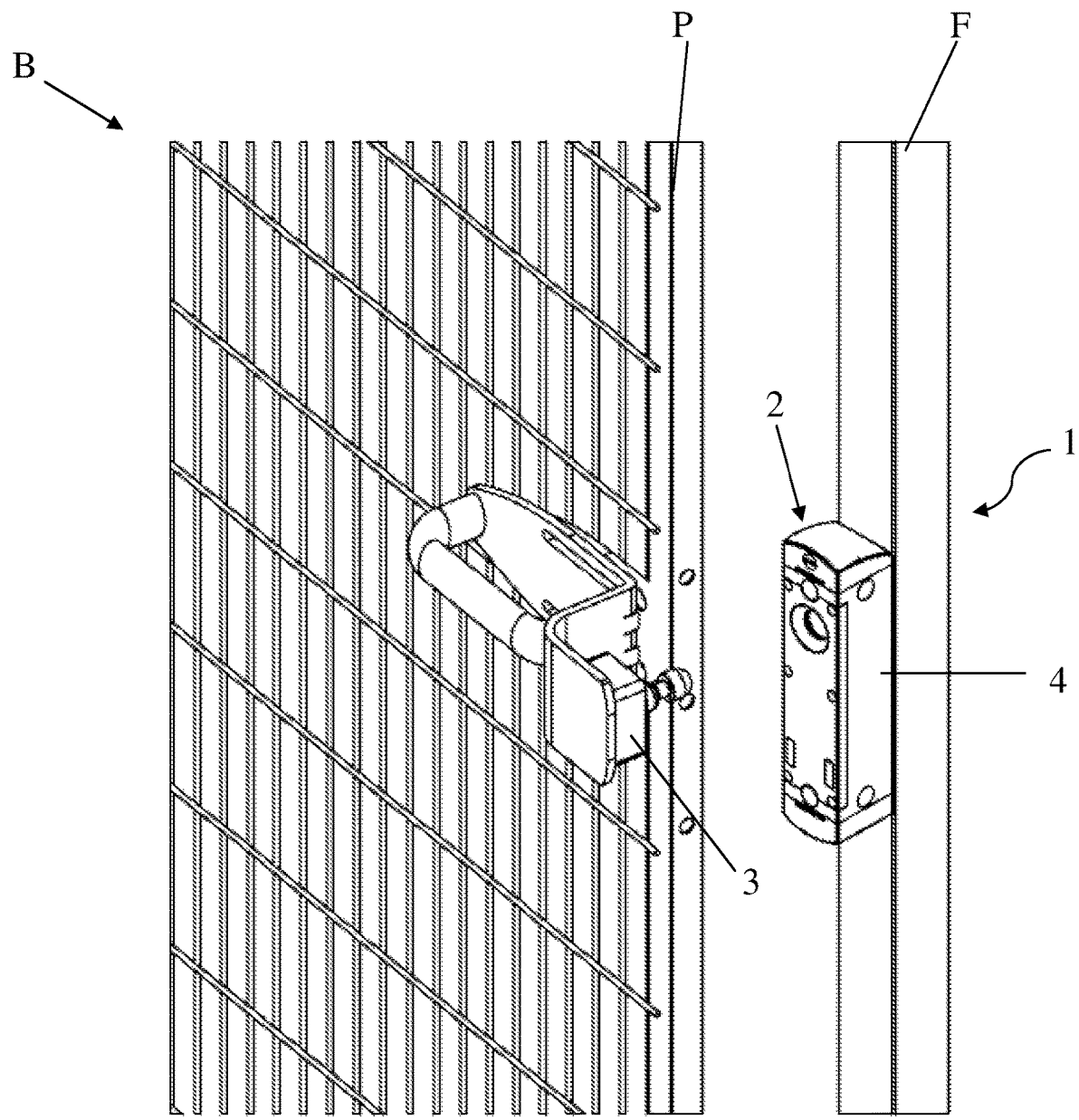
FIG. 1 is a perspective view of a switch in a preferred embodiment and in a first assembly mode for its fixing to an access with hinged opening.

FIG. 1 shows a switch, generally indicated by 1, applied to an access of a protection barrier B provided with a left-hand opening door P. However, it is understood that the switch can also be applied to doors having a right-hand opening or to sliding doors or having other type of opening, without particular limitations.

In a typical manner for this kind of devices, the switch 1 comprises a switching device 2 adapted to be fixed to the fixed frame F of the protection B and connected in a known manner to one or more electric and/or electronic circuits for power supply and/or for the control of the main circuit and/or service and emergency circuits, not shown.

The methods of connecting the switching device 2 to these circuits are of known type and do not form part of the present invention, so that they will not be described in more detail hereinafter.

An actuator device 3 is mounted instead on the movable part P of the protection B and is adapted to interact with the switching device 2 upon opening or closing of the access to determine the opening or closing of one or more circuits according to typical methods of such safety switches.

The switching device 2 comprises a casing 4 adapted to be anchored to the fixed part of the barrier B at the access to be monitored and housing thereinside the switching means for controlling one or more control and/or service circuits of the machine or plant.

The switching means, not visible from the figures as they are inside the casing 4, may be selected from those commonly used in the sector and may also vary according to the functionality of the switch, without particular limitations.

Inside the casing 4 there will also be actuator means of known type suitable for interacting with the switching means at the opening/closing of the access for the opening/closing of one or more circuits of the machine or plant upon the interaction between the switching device 2 and the actuator device 3, also in this case according to known techniques.

In the illustrated embodiment, the switch is of the electronically actuated type, that is, provided with a remote communication system between the two switching and actuator devices, which in a preferred but not exclusive manner may be provided with Tag/RFID (Radio-Frequency Identification) communication means configured according to known modes in the sector.

For example, the switching device 2 may house a receiver, such as an RFID antenna, inserted inside the casing 4 and designed to receive a remote control signal, or a presence signal, transmitted by a transmitter or transponder housed, in turn, in the actuator device 3, when the latter is at the minimum distance detectable by the switching device 2.

In particular, the transponder will be provided with a tag having an identification code that should be recognized by the receiver in order to allow the machine or system to start up.

The recognition of the code may be univocal or generic, depending on whether you want to make a switch with a high or low level of coding.

However, according to alternative embodiments, not shown, the switch 1 may also be mechanically or electro-mechanically operated with a key actuator.

Regardless of the configuration adopted, the actuator device 3 is designed to interact with the switching means through the actuator means upon the opening or closing of the access to determine the opening or closing of one or more circuits according to typical methods of such safety switches.

The switching device 2 also houses locking/unlocking means, not visible, which will be configured to lock the actuator device 3 to the switching device 2 upon their mutual interaction following the closure of the access and to allow their separation following the sending of an appropriate signal in order to allow access to be open.

Figure 2:
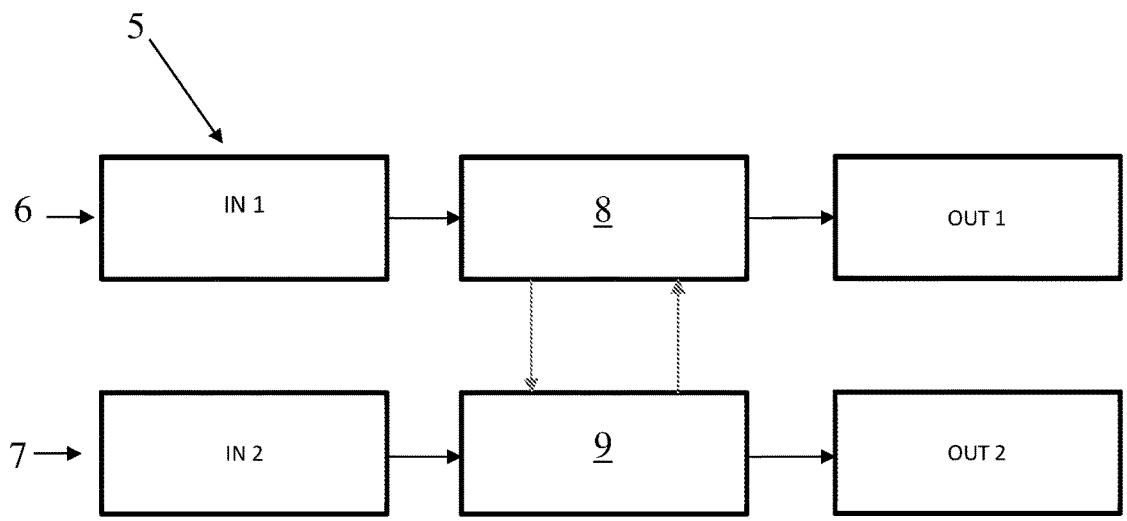
FIG. 2 is a logical scheme of the control unit of the switch according to the invention.

The switch 1 will also be provided with an electronic control unit 5 having a first communication channel 6 with a first input IN1 and a first output OUT1 and a second communication channel 7 with a second input IN2 and a second output OUT2, as shown in FIG. 2. Both the inputs IN1 and IN2 and the outputs OUT1 and OUT2 are electronic.

The two channels 6, 7 will be designed to receive and transmit information relating to the conditions of locking and opening of the accesses according to the status detected for the corresponding actuator device 3 on the basis of the signals received at the input.

Both the first output OUT1 and the second output OUT2 will be of the safe type and will be designed to vary their status upon detection of a specific removal/insertion and/or locking condition for the actuator device 3.

In particular, differently from the state of the art, the electronic control unit 5 will be designed to vary the state of the two outputs OUT1 and OUT2, depending on the detection respectively of a first and of a second condition for the actuator device 3 which are different from each other.

By way of example, the first output OUT1 will vary its state upon detection of a first condition of the actuator device 3, in which the actuator device 3 is inserted and unlocked with respect to the switching device[2].

In turn, the second output OUT2 may vary its state upon detection of a second condition in which the actuator device 3 is inserted but locked with respect to the switching device 2.

In this way, the unlocking of the actuator device 3 will not cause the deactivation of all the outputs OUT1 and OUT2 but one of them, in the specific case OUT1, will remain active in order to allow the operation of the downstream machines.

Obviously, the operating logic of the two communication channels 6, 7 may be inverted with respect to what described, without departing from the scope of protection of the present invention.

Advantageously, both the first input IN1 and the second input IN2 will be safe inputs in order to guarantee a relatively high degree of safety.

Furthermore, the communication channels 6, 7 may be either normally excited or normally de-energized, depending on the preferences. In general, in fact, the control unit 5 will be provided with an electromagnet, not illustrated as known per se, which will activate/deactivate the locking/unlocking means as a function of an input signal.

This input signal may be a double signal, i.e. two distinct signals may be provided for locking and unlocking (LOCK/ UNLOCKED) in order to increase the safety level.

Moreover, the communication channels 6, 7 will comprise respective management logic units 8, 9 adapted to detect error signals and which will be designed to communicate with each other in a manner substantially identical to what happens for the double channel circuits of the highest level in order to allow redundant control over errors, thus generating a system shutdown following the detection of error signals regardless of which channel has generated them.

According to a further particularly advantageous aspect, the safe outputs OUT1 and OUT2 may be adapted to send pulsed signals or formed by series of pulses suitable for univocally identifying the respective actuator device 3 and/ or for transmitting further possible information, such as, in a non-exhaustive manner, ambient temperature, supply voltage, article serial code, number of drives and the like.

In turn, the electronic control unit 5 will comprise a decoding circuit adapted to receive a series of pulses coming from an output of a switch connected in series and suitable for identifying the actuator device 3.

Figure 3:
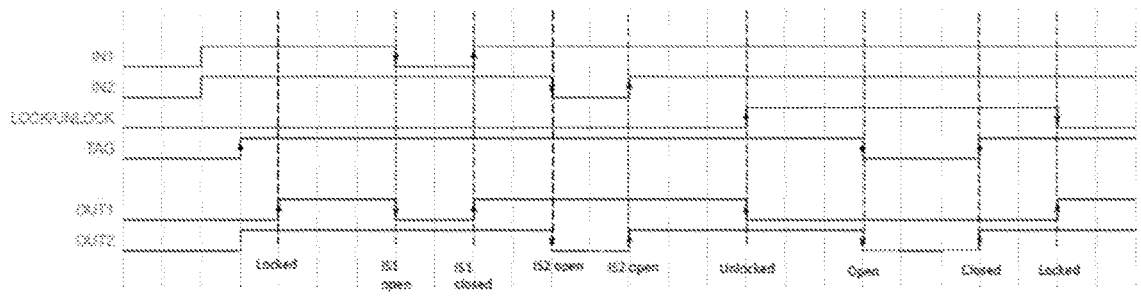
FIG. 3 is a working diagram of the switch according to the invention.

The diagram in FIG. 3 shows a possible operating mode related to operation with actuator device 3 locked with a de-energized electromagnet.

From this diagram it is observed that in the phase before the plant start-up both the safe inputs IN1 and IN2 and the two safe outputs OUT1 and OUT2 are off and then, at the start of the plant, the activation of the two inputs IN1 and IN2 occurs.

Following the detection of the state of closed access by means of the detection of the TAG, the second output OUT2 will be activated, which will therefore discriminate the condition of closed but not locked access.

The first output OUT1, on the other hand, will be activated only after the locking (Locked) of the access by means of the locking/unlocking means provided with an electromagnet.

Any deactivation and subsequent activation of the two inputs IN1 and IN2 will determine the deactivation and subsequent activation of the corresponding outputs OUT1 and OUT2. The activation of the electromagnet, in this case normally de-energized, will produce the unlocking of the actuator device 3 with respect to the switching device 2 and the consequent release of the access.

The first output OUT1, which discriminates the closed and locked access condition, will be deactivated while the second output OUT2 will remain in its activation condition until the opening of the access, in which condition the TAG is no longer detected.

The subsequent closing of the access, with consequent detection of the TAG, will produce the activation of the second output OUT2 while the subsequent locking of the access, resulting from the return of the locking/unlocking electromagnet in the condition of locked access, will produce the activation also of the first output OUT1.

Obviously, the operation of the two outputs OUT1 and OUT2 may be reversed, just as the electromagnet may operate in reverse to be normally excited to produce the locking of the access following its de-energization.

Figure 4:
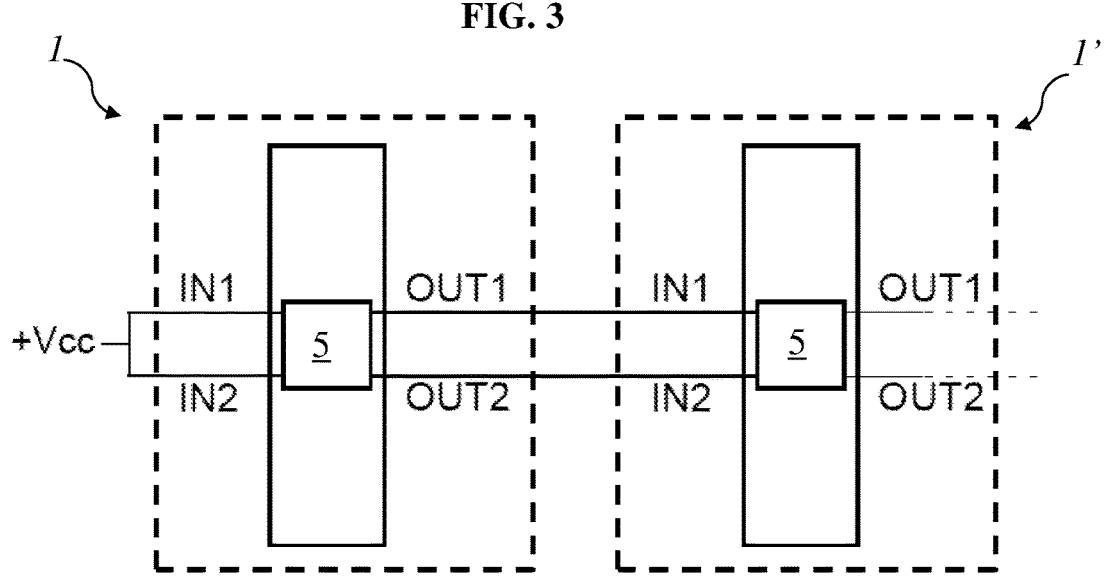
FIG. 4 is a logical scheme of the series connection of two switches according to the invention adapted to control two different accesses of a same industrial plant.

Finally, FIG. 4 shows the connection of two switches 1, 1' according to the present invention, designed to guard two distinct accesses of a protection of a machine or industrial plant and in which the downstream switch 1' has inputs IN1 and IN2 connected in series with respective outputs OUT1 and OUT2 of the switch 1 arranged upstream.

The switch according to the invention is susceptible of numerous modifications and variations, all of which are within the inventive concept expressed in the appended claims. All the details may be replaced by other technically equivalent elements, and the materials may be different according to requirements, without departing from the scope of protection of the present invention.

The invention claimed is:

1. A safety switch for controlling the access to industrial machines or plants, comprising:
   a switching device adapted to be associated with a fixed part of the access to be controlled and operably connectable to one or more control and/or service circuits of the plants for controlling thereof;
   an actuator device associated with a movable part of the access to interact with said switching device at the opening/closing of the access for opening/closing one or more of said circuits and passing from a removed condition to an inserted condition;
   a lock housed in said switching device and adapted to lock said actuator device on said switching device following their mutual interaction;
   an electronic control circuitry having a first communication channel with a first inlet and a first outlet and a second communication channel with a second inlet and a second outlet, said communication channels being adapted to receive and transmit information about the locked and open conditions of the accesses according to the state of the corresponding actuator device;
   wherein said first inlet and said second outlet are of safe type and adapted to vary their state after detecting said removed/inserted and/or locked condition of said actuator device;
   characterized in that said electronic control circuitry is adapted to vary the state of said first outlet and said second outlet upon detection respectively of a first and a of second condition for said actuator device, wherein said first and said second conditions are different from each other.

2. The safety switch as claimed in claim 1, characterized in that said first outlet is adapted to vary its state after the detection of a first condition for said actuator device, wherein said actuator device is inserted and unlocked with respect to said switching device.

3. The safety switch as claimed in claim 2, characterized in that said second outlet is adapted to vary its state after the detection of a second condition for said actuator device, wherein said actuator device is inserted and locked with respect to said switching device.

4. The safety switch as claimed in claim 1, characterized in that said first inlet and said second inlet are safety inlets.

5. The safety switch as claimed in claim 1, characterized in that said communication channels are normally excited.

6. The safety switch as claimed in claim 1, characterized in that said communication channels are normally de-energized.

7. The safety switch as claimed in claim 1, characterized in that said communication channels comprise respective logic management circuitry for detecting error signals and communicating with each other for error checking in a double channel way.

8. The safety switch as claimed in claim 1, characterized in that said safe outlets are adapted to transmit pulse signals or pulse series to uniquely identify the respective actuator device.

9. The safety switch as claimed in claim 8, characterized in that said electronic control circuitry comprises a decoding circuit adapted to receive a series of pulses from an outlet of a series-connected switch adapted to identify the actuator device thereof.

10. A switch assembly for controlling access to a machine or industrial plant, comprising a plurality of safety switches, each safety switch comprising:
- a switching device adapted to be associated with a fixed part of the access to be controlled and operably connectable to one or more control and/or service circuits of the plants for controlling thereof;
- an actuator device associated with a movable part of the access to interact with said switching device at the opening/closing of the access for opening/closing one or more of said circuits and passing from a removed condition to an inserted condition;
- a lock housed in said switching device and adapted to lock said actuator device on said switching device following their mutual interaction;
- an electronic control circuitry having a first communication channel with a first inlet and a first outlet and a second communication channel with a second inlet and a second outlet, said communication channels being adapted to receive and transmit information about the locked and open conditions of the accesses according to the state of the corresponding actuator device;
- wherein said first inlet and said second outlet are of safe type and adapted to vary their state after detecting said removed/inserted and/or locked condition of said actuator device;
- wherein said electronic control circuitry is adapted to vary the state of said first outlet and said second outlet upon detection respectively of a first and a of second condition for said actuator device, wherein said first and said second conditions are different from each other,
- wherein said safety switches have respective inlets and outlets;
- wherein each of said safety switches has respective outlets connected in series with the inlets of the switch arranged downstream.

\* \* \* \* \*